(12) United States Patent
Shirota

(10) Patent No.: US 7,584,275 B2
(45) Date of Patent: Sep. 1, 2009

(54) NETWORK SYSTEM, SERVER, APPARATUS MANAGEMENT METHOD AND PROGRAM

(75) Inventor: Masakazu Shirota, Musashino (JP)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 10/900,794

(22) Filed: Jul. 27, 2004

(65) Prior Publication Data

US 2005/0044202 A1 Feb. 24, 2005

(30) Foreign Application Priority Data

Aug. 6, 2003 (JP) ............................. 2003-287374

(51) Int. Cl.
*G06F 15/173* (2006.01)
(52) U.S. Cl. ...................... 709/223; 709/224; 709/226; 709/229; 702/188; 702/183; 702/185
(58) Field of Classification Search ................. 709/223, 709/224, 226, 229; 702/188, 183, 185
See application file for complete search history.

(56) References Cited

U.S. PATENT DOCUMENTS

| | | | | | |
|---|---|---|---|---|---|
| 6,018,690 | A | * | 1/2000 | Saito et al. ................... | 700/295 |
| 6,167,445 | A | * | 12/2000 | Gai et al. ...................... | 709/223 |
| 6,301,674 | B1 | * | 10/2001 | Saito et al. ................... | 713/340 |
| 6,393,474 | B1 | * | 5/2002 | Eichert et al. ................ | 709/223 |
| 6,766,223 | B1 | * | 7/2004 | Motoyama ................... | 700/286 |
| 6,885,974 | B2 | * | 4/2005 | Holle .......................... | 702/182 |
| 7,032,119 | B2 | * | 4/2006 | Fung ............................ | 713/320 |
| 7,069,161 | B2 | * | 6/2006 | Gristina et al. ................ | 702/61 |
| 7,110,913 | B2 | * | 9/2006 | Monroe et al. ............... | 702/179 |
| 7,185,073 | B1 | * | 2/2007 | Gai et al. ...................... | 709/221 |
| 7,284,244 | B1 | * | 10/2007 | Sankaranarayan et al. .. | 718/104 |
| 7,305,431 | B2 | * | 12/2007 | Karnik et al. ................ | 709/203 |
| 7,328,259 | B2 | * | 2/2008 | Srinivasan et al. ........... | 709/223 |
| 2003/0046396 | A1 | * | 3/2003 | Richter et al. ................ | 709/226 |
| 2004/0181476 | A1 | * | 9/2004 | Smith et al. ................... | 705/35 |

FOREIGN PATENT DOCUMENTS

| JP | PUPA2000-322161 | 11/2000 |
|---|---|---|
| JP | 2001255966 A | 9/2001 |
| JP | 2002142385 A | 5/2002 |
| JP | PUPA2002-292977 | 10/2002 |
| JP | PUPA2002-297353 | 10/2002 |
| JP | PUPA2003-131763 | 5/2003 |
| JP | 2003175282 A | 6/2003 |

* cited by examiner

*Primary Examiner*—John Follansbee
*Assistant Examiner*—Dohm Chankong
(74) *Attorney, Agent, or Firm*—Schmeiser, Olsen & Watts; William H. Steinberg

(57) ABSTRACT

A management server and a group of apparatuses to be managed, which are connected to each other through a network, are provided. Each apparatus to be managed constituting the group of apparatuses to be managed sends to the management server operation information indicating its operating condition according to predetermined timing. The management server monitors, on the basis of the operation information obtained from each apparatus to be managed, the amount of consumption of a resource with respect to a predetermined unit (e.g., an individual user or an organization to which the user belongs) set for a user of the apparatus to be managed or the group of apparatuses to be managed, and dynamically controls the operating condition of the apparatus to be managed.

3 Claims, 10 Drawing Sheets

| | |
|---|---|
| DATE | APRIL 1, 2003, 9:00 |
| USER NAME | none |
| TASK STATUS | 60% |
| APPARATUS MANAGEMENT NUMBER | 1 |
| RECEIVED POWER CONSUMPTION SETTING MODE | none |
| POWER CONSUMPTION SETTING MODE | 1 |
| APPARATUS CONFIGURATION | SERVER X, MONITOR XXYY |

FIG. 7

| THROTTLE VALUE | SUM OF POWER CONSUMPTIONS |
| --- | --- |
| 90–100 | 60W = CLPC5 (MODE 1):20W + CLPC6 (MODE 1):20W + CLPC7 (MODE 1):20W |
| 70– 89 | 40W = CLPC5 (MODE 2):10W + CLPC6 (MODE 2):10W + CLPC7 (MODE 1):20W |
| 20– 69 | 20W = CLPC5 (MODE 3): 1W + CLPC6 (MODE 3): 1W + CLPC7 (MODE 1):20W |
| 0– 19 | 3W = CLPC5 (MODE 3): 1W + CLPC6 (MODE 3): 1W + CLPC7 (MODE 3): 1W |

FIG. 8

NETWORK SYSTEM, SERVER, APPARATUS MANAGEMENT METHOD AND PROGRAM

FIELD OF THE INVENTION

The present invention relates to a management system which is adapted to a distributed system in particular, and which performs management of resources provided to apparatuses to be managed and control of provision of the resources, the apparatuses being connected to a network.

BACKGROUND OF THE INVENTION

Today, as a method of using a plurality of computers and electronic apparatuses, construction of a distributed system in which electronic apparatuses having functions corresponding to those of the computers and network functions are connected to distribute processing is being generally practiced. If the number of apparatuses constituting such a distributed system is increased, the electric power consumption is also increased. Therefore, the challenge from the viewpoint of energy saving and reduction in cost is to reduce the electric power consumption in distributed systems. The same can also be said with respect to resources other than electric power, e.g., the amount of printing sheets used in printers.

The power saving design of single machines constituting distributed systems have progressed. A method of setting a power saving mode in which supply of electric power for unused functions is shut off and a method of reducing the electric power consumption during operation itself by devising a suitable hardware design have been practiced.

Also, a technique for controlling the electric power consumption through the whole of a distributed system having a plurality of printers placed on a network has been proposed in Japanese published Unexamined Patent Application No. 2002-142385 published May 17, 2002.

It is important to reduce the electric power consumption in a distributed system. However, no energy saving design of single machines has been provided as a design suitably reflecting a target power consumption reduction and a power consumption policy with respect to a unit corresponding to the whole of a distributed system, the entire building in which the distributed system is installed or an organization (a company or the like) using the distribution.

The amounts of resources used by different users vary largely. For example, the frequency of use of printing sheets may vary largely depending on users. However, since information on such conditions is not managed on a user-by-user basis, a target reduction or a target achievement with respect to the entire distributed cannot be effectively managed.

The conventional art disclosed in patent document 1 is intended to manage the electric power consumption with respect to the whole of a distributed system. However, this art is the technique of limiting the total power consumption in the entire system through association of a plurality of printers placed on a network in a situation where the total power consumption can exceed an acceptable limit when a certain number of the printers are simultaneously operated. Therefore, this art does not reduce the amount of consumption of a resource with respect to a unit corresponding to the entire distributed system, the entire building in which the distributed system is installed or an organization using the distributed system by controlling a time factor such as a predetermined time period and the amount of consumption of a resource in each of individual machines.

OBJECTS AND SUMMARY OF THE INVENTION

It is, therefore, an object of the present invention to realize, in a distributed computer system in particular, effective resource management and resource provision control with respect to a unit corresponding to the entire distributed system, the entire building in which the distributed system is installed or an organization using the distributed system.

The present invention provided to achieve the above-described object is implemented as a network system (management system) described below. That is, this system has a management server and a group of apparatuses to be managed, the management server and the group of apparatuses to be managed being connected to each other through a network. Each apparatus to be managed constituting the group of apparatuses to be managed sends operation information indicating its operating condition to the management server according to predetermined timing. The management server monitors, on the basis of the operation information obtained from each apparatus to be managed, the amount of consumption of a resource with respect to a predetermined unit (e.g., an individual user or an organization to which the user belongs) set for a user of the apparatus to be managed or the group of apparatuses to be managed, and dynamically controls the operating condition of the apparatus to be managed.

More specifically, this management server has monitoring means of obtaining, from each apparatus to be managed constituting the group of apparatuses to be managed, operation information indicating the operating condition of the apparatus to be managed, and monitoring, on the basis of the operation information, the amount of consumption of a resource with respect to a predetermined unit set for a user of the apparatus to be managed or the group of apparatuses to be managed, and operating condition control means of issuing, on the basis of the result of monitoring by the monitoring means, a control command to dynamically control the operating condition of each apparatus to be managed.

This monitoring means compares an amount of use of the resource in each of the group of apparatuses to be managed, which amount is set on the basis of a predetermined resource consumption target with respect to the predetermined unit in the group of apparatuses to be managed or the user of the apparatus to be managed, with the operation information obtained from the apparatus to be managed thereby determining whether or not control by the operating condition control means should be performed. Also, this monitoring means determines whether or not control by the operating condition control means should be performed, on the basis of the amount of use of the resource in the apparatus to be managed, which amount is set for a predetermined period or with respect to a predetermined time period.

This operating condition control means computes a throttle value set for control of the amount of supply of the resource to each of the apparatuses to be managed, on the basis of control conditions set in advance and the operation information, and issues a control command such that the apparatus to be managed is in the operating condition corresponding to the throttle value.

Also, this management server may have resource distribution means of setting an amount of use of a resource under a predetermined condition for each apparatus to be managed constituting the group of apparatuses to be managed. This resource distribution means sets an amount of use of the resource in each of the apparatuses to be managed, on the basis of a predetermined resource consumption target set with respect to the predetermined unit in the group of apparatuses to be managed or the user of the apparatus to be managed. Further, this resource distribution means sets the amount of use of the resource for a predetermined period or in a predetermined time period.

In this network system, each apparatus to be managed constituting the group of apparatuses to be managed transmits the operation information to the management server at the time of startup and when its operating condition is changed.

The present invention provided to achieve the above-described object is also implemented as an apparatus management method of managing, by using a computer connected to a network, a group of apparatuses to be managed which are connected to the network. This apparatus management method includes a first step of setting an amount of use of a resource under a predetermined condition for each apparatus to be managed constituting the group of apparatuses to be managed, and storing information on the setting in predetermined storage means, a second step of obtaining from the apparatus to be managed operation information indicating the operating condition of the apparatus to be managed, and monitoring, on the basis of the operation information, the amount of consumption of a resource with respect to a predetermined unit set for a user of the apparatus to be managed or the group of apparatuses to be managed, and a third step of issuing, on the basis of the setting stored in the predetermined storage means and the result of the monitoring, a control command to dynamically control the operating condition of the apparatus to be managed.

Further, the present invention is implemented as a program by which a computer is controlled to function as the above-described management server, or a program for making a computer execute processing corresponding to each step in the above-described apparatus management method. This program is provided by being distributed in a state of being stored on a magnetic disk, an optical disk, a semiconductor memory or any other recording medium, or by being transmitted over a network.

Further, the present invention is implemented as a program by which a computer is controlled to function as the above-described management server, or a program for making a computer execute processing corresponding to each step in the above-described apparatus management method. This program is provided by being distributed in a state of being stored on a magnetic disk, an optical disk, a semiconductor memory or any other readable medium, or by being transmitted over a network.

BRIEF DESCRIPTION OF THE DRAWINGS

FIG. 7 is a diagram showing an example of a configuration of data sent from an apparatus to be managed to the management server in a report used in the embodiment;

FIG. 8 is a diagram showing an example of setting conditions in a case where a resource policy is reevaluated by a resource policy evaluation section in the embodiment;

BEST MODE FOR CARRYING OUT THE INVENTION

The best mode of carrying out the invention (hereinafter referred to as "embodiment") will be described with reference to the accompanying drawings.

Figure 1:
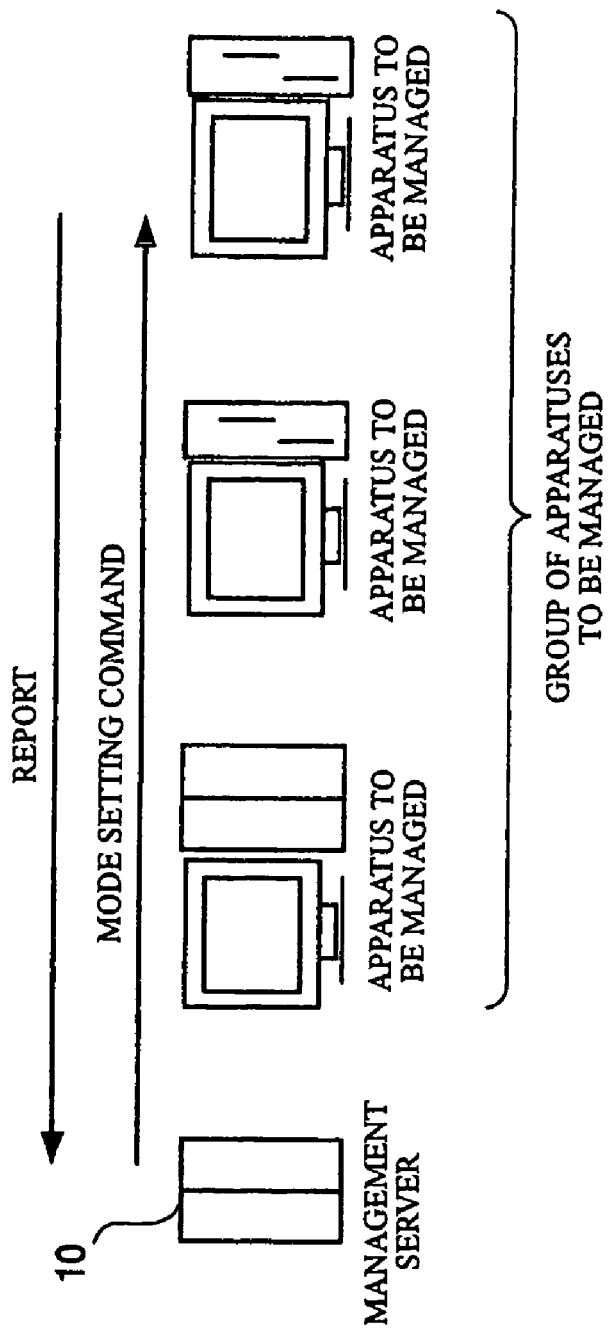
FIG. 1 is a diagram showing the entire configuration of a management system according to an embodiment of the present invention.

FIG. 1 is a diagram showing the entire configuration of a management system (network system) according to this embodiment.

Referring to FIG. 1, this embodiment includes a management server 10 connected to a network such as a LAN (local area network) and a group of apparatuses to be managed with which a distributed system environment is realized. The group of apparatuses to be managed may be arranged as server machines, client terminals, printers having network functions or the like in any configuration, for example, according to the configuration of an organization using the group of apparatuses. The management server 10 performs management of resources used by the group of apparatuses to be managed and control of provision of the resources. With respect to this embodiment, a case in which management of power supply used as a resource and control of power supply will be described by way of example.

Figure 2:
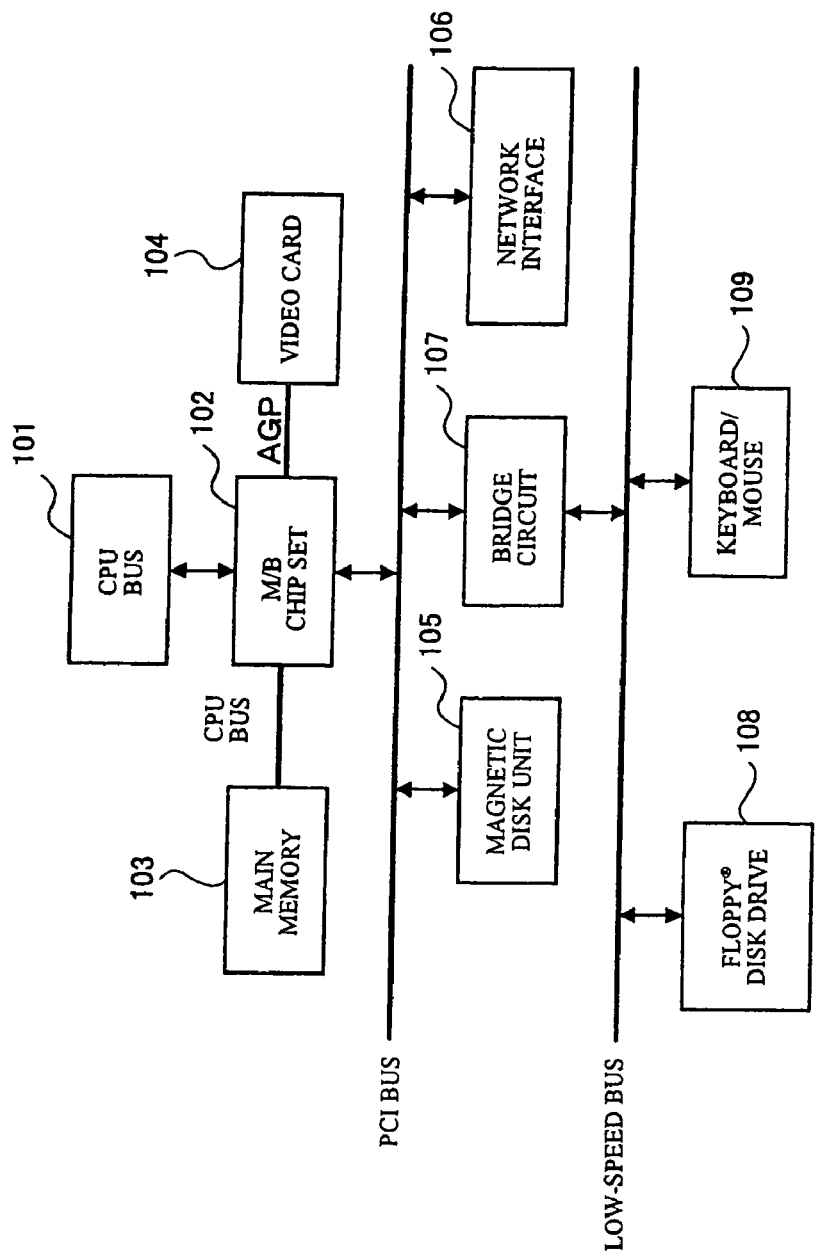
FIG. 2 is a diagram schematically showing an example of a hardware configuration of a computer suitable for implementation of the management server.

The management server 10 used in this embodiment is implemented as a workstation, a personal computer or some other computer. FIG. 2 is a diagram schematically showing the hardware configuration of a computer suitable for implementation of the management server 10.

The computer shown in FIG. 2 has a CPU (central processing Unit) 101, a main memory 103 connected to the CPU 101 via an M/B (mother board) chip set 102 and a CPU bus, a video card 104 also connected to the CPU 101 via the M/B chip set 102 and an AGP (Accelerated Graphics Port), a magnetic disk unit (HDD) 105 connected to the M/B chip set 102 via a PCI (Peripheral Component Interconnect) bus, a network interface 106, and a floppy disk drive 108 and a keyboard/mouse 109 connected the M/B chip set 102 via the PCI bus, a bridge circuit 107 and a low-speed bus such as an ISA (industry standard architecture) bus.

FIG. 2 only shows an example of a computer hardware configuration for implementation of this embodiment. Any other configuration may be adopted if this embodiment is applicable thereto. For example, not the video card 104 but only a video memory is mounted and processing of image data may be performed by the CPU 101. Also, a drive such as a CD-R (compact disc recordable) or a DVD-RAM (digital Versatile disc random access memory) may be provided by being connected via an interface such as an ATA (AT Attachment) or a SCSI (small computer system interface).

Figure 3:
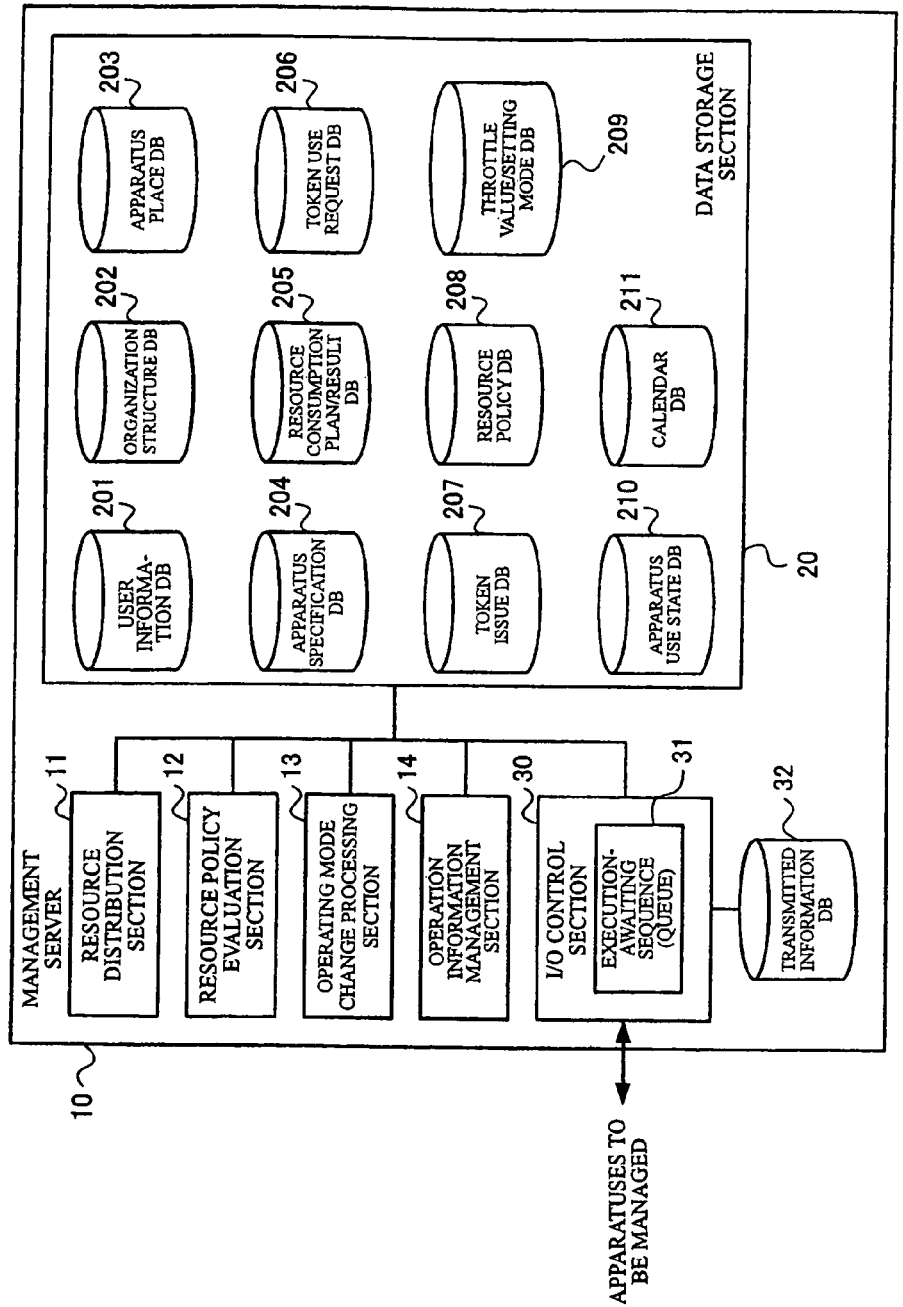
FIG. 3 is a diagram showing the functional configuration of the management server in the embodiment.

FIG. 3 is a diagram showing the functional configuration of the management server 10.

Referring to FIG. 3, the management server 10 has a resource distribution section 11 which distributes resources including electric power to the apparatuses to be managed, a resource policy evaluation section 12 for management of the state of use of the resources and for control of provision of the resources, an operating mode change processing section 13, an operation information management section 14, a data storage section in which data used for the operation of each section is stored, and an I/O (input/output) control section 30 for receiving data from the apparatuses to be managed through the network and for transmitting data to the apparatuses to managed through the network.

In the above-described configuration, the resource distribution section 11, the resource policy evaluation section 12, the operating mode change processing section 13 and the operation information management section 14 are implemented, for example, by means of the program-controlled CPU 101 and main memory 103 of the computer shown in FIG. 2. The data storage section 20 is implemented, for example, by means of the magnetic disk unit 105 and the main memory 103 shown in FIG. 2. The I/O control section 30 is implemented, for example, by means of the program-controlled CPU 101, the main memory 103 and the network interface 106 shown in FIG. 2.

As shown in FIG. 3, in the data storage section 20 are constructed, according to data to be managed, a user information DB (data base) 201, an organization structure DB 202, an apparatus place DB 203, an apparatus specification DB 204, a resource consumption plan/result DB 205, a token use request DB 206, a token issue DB 207, a resource policy DB 208, a throttle value/setting mode DB 209, an apparatus use state DB 210, and a calendar DB 211.

In the user information DB 201 in the above-described data bases, information shown below is stored with respect to each of users of the apparatuses to be managed.

"User Name" is a name for identification of the user using one of the apparatuses to be managed, "Organization Number" is a number for identification of an organization to which the user belongs, and "User Priority" is a parameter for assigning priorities to the users at the time of distribution of the resources. Distribution of resources will be described in detail.

In the organization structure DB 202, information shown below is stored with respect to each of organizations using the apparatuses to be managed.

In this specification, a case where one organization has two hierarchical levels, i.e., upper and lower level is described by way of example. Even in a case where an organization structure which is an object to be managed has three or more hierarchical levels, it can be expressed by a combination of information based on superior-organization and subordinate-organization numbers (discrimination information).

In the apparatus place DB 203, information shown below is stored with respect to each of the apparatuses to be managed.

"Apparatus Management Number" is a number for identification of the apparatus to be managed, "Apparatus Model" is information indicating the kind of the apparatus (a model identified as a server machine or a client terminal and identified through particular apparatus specifications), and "Organization Number" is a number for identification of an organization using the apparatus. "Installation Area" is information indicating a place where the apparatus is installed and "Use" is information indicating use of the apparatus. "Installation Area" includes information indicating a floor such as a second or third floor and a position on the floor.

More specifically, an area code shown below may be defined to indicate the installed position of the apparatus.

Area Code=(AA+'F'+('R' of 'T')+('N' or 'S')+(BB))

AA: one of pairs of figures such as B3, B2, B1, 01, 02, . . . , 24 for floors of building indicating the number of a floor on which the apparatus is installed.

'F': a fixed value 'F' of one figure indicating the floor.

'R' or 'T': a selected value of one figure indicating a position on the floor ('R'=east side or 'T'=west side.)

'N' or 'S': a selected value of one figure indicating a position on the floor ('N'=north side or 'S'=south side).

BB: a number of two figures (e.g., 01 to 15) indicating an address in one area.

*: indicating an arbitrary value by a wild card.

If the above-described area code system is used, the following installation area condition, for example, may be designated for the apparatus.

Installation area condition 1: 24FRN08

Installation area condition 2: 05F****

Installation area condition 3: 01F** or 02F**

Installation area condition 1 indicates "address 8 on the northeast side on the 24th floor." Installation area condition 2 indicates "an arbitrary position on the fifth floor". Installation area condition 3 indicates "an arbitrary position on the first or second floor".

In the apparatus specification DB 204, information shown below is stored with respect to each of the apparatus to be managed.

"Apparatus Model" is information indicating the kind of the apparatus to be managed. "Number of Operating Modes" is a value representing the number of operating modes (full operation, power-saving operation, etc.) set in the apparatus. "Mode-By-Mode Power Consumption" is power consumption in each operating mode. "Mode-By-Mode Setting Details" is information indicating the state of the apparatus in each operating mode.

In the resource consumption plan/result DB 205, information shown below is stored with respect to each of the apparatus to be managed.

When a date and a token use requester are identified, a resource consumption plan or results are shown as the kind and amount of a resource which will be consumed or the kind and amount of a resource which has been consumed.

In the token use request DB 206, information described below is stored with respect to resources distributed to the apparatuses to be managed.

"Token Numbers" are each a number for identification of a token for use of a resource. "Division Numbers" are each a number for management of division of a resource provided on the basis of a token when the resource is redistributed in an organization. "Token Use Requesters" are information for identification of users and organizations making requests for use of a token.

In the token issue DB 207, information shown below is stored with respect to resources distributed to the apparatuses to be managed.

"Token Distribution Destinations" are information for identification of users and organizations to which issued tokens are distributed. "Kinds of Resources to be Provided" are information for identification of the kinds of resources (electric power, etc.) to be provided. "Amounts of Resources to be Provided" are values representing the amounts of resources (watts per hour, etc.) to be provided. "Provision Periods" are each a time period over which a resource is provided on the basis of a token. "Remaining Amounts of Resources to be Provided" are each a value representing the remaining amount of a resource when a provided resource is used.

The token use request DB 206 and the token issue DB 207 can be referred to from each of the apparatuses to be managed when the apparatus accesses the management server 10.

In the resource policy DB 208, information shown below is stored.

"Evaluation Object Limitation Conditions" are information for designating evaluation objects (target periods, kinds of resources, organizations, task statuses, installation areas, etc.) to be revaluated with respect a resource policy in resource management. "Operation Object Limitation Conditions" are information for designating operation objects (target periods, kinds of resources, organizations, task statuses, installation areas, etc.) for control of provision of resources on the basis of reevaluation of the resource policy. "Operation Details or Achievement Conditions" are information indicating details of operations or conditions for control of provision of resources. "Task statuses" are expressed as "stop" (non-operating status), "idle" (a state in which the apparatus performs no task while it is in operation) and "xx %" (indicating that the task status is xx % of the full operation).

In the throttle value/setting mode DB 209, information shown below is stored.

"Throttle Value" represents the opening of a throttle valve for changing the rate at which a resource is provided to one or a plurality of objects identified. If the parameter "throttle value" is used, it is not necessary to directly describe in the resource policy DB 208 a number of conditions for control of the apparatuses to be managed having various attributes. The facility with which a relative balance is struck between the apparatuses to be managed is thereby improved. Also, an object related to a set throttle value is identified from a user priority, a task status, the kind of resource and use. "Power Consumption Setting Model" is a value indicating a mode related to the throttle value.

In the apparatus use state DB 210, information shown below is stored with respect to each of the apparatuses to be managed.

An object to be managed is identified from a date, a user name, a task status and an apparatus management number. With respect to the power consumption setting mode of the apparatus to be managed, identified as the object to be managed, a value received from the apparatus (received power consumption setting mode), a current set value (current power consumption setting mode) and a value obtained on the basis reevaluation of a resource policy (evaluated power consumption setting mode) are stored. If predetermined management information is sent from the apparatus, it is stored as other received information.

In the calendar DB 211, calendar information used in resource management and provision control, for example, for determination of business days and non-business days of the organization itself using the apparatus to be managed and various agencies relating to resource management and provision control is stored.

Further description will be made of throttle values stored in the throttle value/setting mode DB 209. For example, data shown below means that, with respect to some of the apparatuses in which User Priority=A, Task Status=Idle (the apparatus performs no task while it is in operation), Kind of Resource=Electric Power, Use=Client, if a possible throttle value range is 0 to 100, the power consumption setting mode is set to 3 when the throttle value is 0 to 59;

the power consumption setting mode is set to 2 when the throttle value is 60 to 79; and the power consumption setting mode is set to 1 when the throttle value is 80 to 100;

and that with respect to some of the apparatuses in which User Priority=B, Task Status=Idle, Kind of Resource=Electric Power, Use=Client, the power consumption setting mode is set to 3 when the throttle value is 0 to 69;

the power consumption setting mode is set to 2 when the throttle value is 70 to 89; and the power consumption setting mode is set to 1 when the throttle value is 90 to 100.

[Throttle Value, User Priority, Task Status, Kind of Resource, Use, Power Consumption Setting Mode]

=[80-100, A, Idle, Electric Power, Client, 1]

=[60-79, A, Idle, Electric Power, Client, 2]

=[0-59, A, Idle, Electric Power, Client, 3]

=[90-100, B, Idle, Electric Power, Client, 1]

=[70-89, B, Idle, Electric Power, Client, 2]

=[0-69, B, Idle, Electric Power, Client, 3]

In this arrangement, when the throttle value reduced from 100 becomes 89, the power consumption setting mode of the client terminal used by the user having User Priority=B is changed from 1 to 2. When the throttle value is further reduced to 79, the power consumption setting mode of the client terminal used by the user having User Priority=A is changed from 1 to 2. If the throttle value is used in this manner, the priority with which electric power is supplied can be controlled according to the difference between user priorities.

In the management server 10 shown in FIG. 3, the resource distribution section 11 is a resource distribution means by which a setting of distribution of resources to the apparatuses to be managed is made. This setting is made as preliminary processing for resource management and provision control. The resource distribution setting is made by collecting necessary information relating to the apparatuses to be managed to which resources are distributed and users and organizations using the apparatuses to be managed from the user information DB 201, the organization structure DB 202, the apparatus place DB 203 and the apparatus specification DB 204 in the data storage section 20. Results of distribution of resources by the resource distribution section 11 are written to the token issue DB 207.

The resource policy evaluation section 12 is a means for monitoring the apparatuses to be managed and for controlling the operating condition, by which a resource policy is evaluated according to predetermined timing in resource management and provision control, and the power consumption setting mode is set on the basis of the result of evaluation. A resource policy is a policy to control the operations of the apparatuses to be managed on the basis of resource consumption targets set with respect to predetermined units such as the apparatuses to be managed or users and organizations using the apparatuses to be managed. As a concrete detail of evaluation, reevaluation of the throttle value may be first mentioned. This is a process in which a limited selection is individually made from the object apparatuses (apparatuses to be managed) under evaluation object limiting conditions in a plurality of conditions included in a resource policy, and the maximum of the throttle value satisfying evaluation conditions individually set, e.g., a total power consumption is obtained under limiting conditions which are direct and fixed conditions shown as the other conditions. Evaluation of a direct and fixed condition may also be mentioned as a type of evaluation. This is, for example, a process in which the throttle value is set to a particular value or a process in which the power consumption setting mode of some of the apparatuses satisfying certain conditions is directly designated. By performing these processes, the provision of resources to the apparatuses to be managed is dynamically controlled. Evaluation of a resource policy is performed by collecting necessary information from the user information DB 201, the organization structure DB 202, the apparatus place DB 203, the apparatus specification DB 204, the resource consumption plan/result DB 205, the resource policy DB 208, the throttle value/setting mode DB 209, the apparatus use state DB 210, and the calendar DB 211 in the data storage section 20. The value of the power consumption setting mode finally obtained is written to the evaluated power consumption setting mode in the apparatus use state DB 210.

The operating mode change processing section 13 is an operating condition control means by which a mode setting command for changing the power consumption setting mode of the apparatuses to be managed is issued on the basis of the power consumption setting mode written to the apparatus use state DB 210 by the resource policy evaluation section 12. The issued mode setting command is transmitted to the corresponding apparatus to be managed to actually change the power consumption setting of the apparatus. In this manner, the operating condition of the apparatus to be managed can be controlled so that the amount of a resource used is within the range of the amount of use set on the basis of a resource consumption target set in advance.

The operation information management section 14 receives information (operation information) indicating the operating condition from the apparatuses to be managed and accumulates a log in the apparatus use state DB 210. From this operation information, a determination can be made as to whether each apparatus to be managed is connected to the management server 10 and resource provision control an be reflected in the apparatus or the connection is cut off and resource provision control an be reflected in the apparatus. In the latter case, transmission of an instruction command to the apparatus to be managed is awaited in the I/O control section 30 until the connection is restored. Also, the operation information management section 14 updates the resource consumption result value (amount) in the resource consumption plan/result DB 205 periodically or on the basis of operation information when receiving the operation information from the apparatuses to be managed.

The I/O (input/output) control section 30 receives token use requests and operation information sent from the apparatuses to be managed and sends the received requests and information to the token use request DB 206, the resource policy evaluation section 12, the operation information management section 14 and the apparatus use state DB 210. The I/O (input/output) control section 30 also sends to the apparatuses to managed a notice of a detail of token distribution and a mode setting command issued from the operating mode change processing section 13. As shown in FIG. 3, the I/O (input/output) control section 30 has an execution-awaiting sequence (queue) 31 realized in a cache memory such as a RAM and a transmitted information DB (data base) 32 realized in the magnetic disk unit 105 shown in FIG. 2, or the like. When the connection to one of the apparatuses to be managed to which a notice and a command are to be transmitted is cut off, the notice and the command are held in the execution-awaiting sequence 31 and are transmitted after the connection to the apparatus has been restored.

The transmitted information DB 32 stores a token distribution detail notice and a mode setting command before the notice and the command are held in the execution-awaiting sequence 31 or when the execution-awaiting sequence 31 becomes full, thereby ensuring that even in a case where a partial network fault or the like occurs and notices and commands overflow the execution-awaiting sequence 31, the other sections of the management system can operate without stopping. In a case where, for example, a plurality of setting mode change information items for a particular one of the apparatuses to be managed is stored in the transmitted information DB 32, unnecessary records may be discarded and only the latest record may be left.

The operation of this embodiment in resource management and provision control will now be described in detail with respect to a concrete example of a system configuration.

Figure 4:
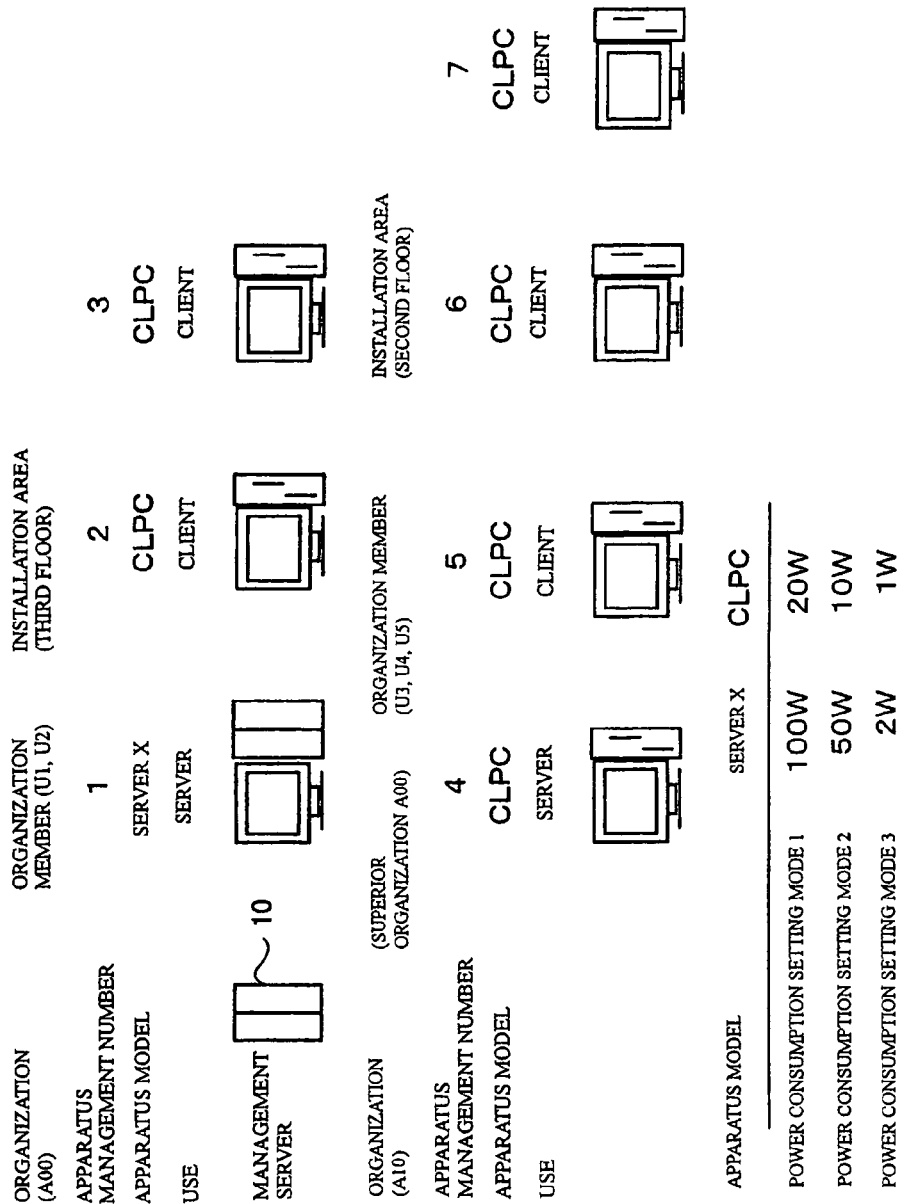
FIG. 4 is a diagram showing a concrete example of the configuration of the management system according to the embodiment.

FIG. 4 is a diagram showing a concrete example of the configuration of the management system according to this embodiment.

Referring to FIG. 4, a distributed system managed by the management server 10 is constituted by seven apparatuses to be managed, the apparatuses having apparatus management numbers 1 to 7. The apparatuses are installed on the second and third floors of a certain building. The apparatuses having the apparatus management numbers 1 to 3 are installed on the third floor. An organization A00 and organization members U1 and U2 use these apparatuses. The apparatus model having the apparatus management number 1 is a server machine (server X) used as a server. The apparatus models having the apparatus management numbers 2 and 3 are personal computers (CLPCS) each of which is used as a client of the server X.

The apparatuses having the apparatus management numbers 4 to 7 are installed on the second floor. An organization A10 and organization members U3, U2, and U5 use these apparatuses. The apparatus model having the apparatus management number 4 is a personal computer (CLPC) which is used as a server for the apparatuses having apparatus management numbers 5 to 7. The apparatus models having the apparatus management numbers 5 to 7 are personal computers (CLPCS) each of which is used as a client of the apparatus having the apparatus management number 4. The organization A10 is subordinate to the organization A00.

The power consumption setting mode is defined in three steps with respect to each of the apparatuses to be managed. In the case of the server X, the power consumption in the power consumption setting mode 1 is 100 W, the power consumption in the power consumption setting mode 2 is 50 W, and the power consumption in the power consumption setting mode 3 is 2 W. Similarly, in the case of each CLPC, the power consumption in the power consumption setting mode 1 is 20 W, the power consumption in the power consumption setting mode 2 is 10 W, and the power consumption in the power consumption setting mode 3 is 1 W.

Setting in the power consumption setting mode in each apparatus model is defined in the apparatus specification DB 204. It is assumed here that settings shown below are defined with respect to the server X and the CLPC.

=[Sever X, 3, (100 W, 50 W, 2 W, (Unlimited, Display OFF, Sleep)]

=[CLPC, 3, (20 W, 10 W, 1 W, (Unlimited, Display OFF, Suspended)]

For example, in the sever X, the operating modes (power consumption setting mode) has three steps and the power consumptions in the operating modes are 100 W, 50 W and 2 W, as mentioned above. The setting detail in the power consumption setting mode 1 is "Unlimited" (full operation), the setting detail in the power consumption setting mode 2 is "Display OFF" on a display unit (non-display state), and the setting detail in the power consumption setting mode 3 is "Sleep" (a state in which data on the state of the operation of the apparatus is stored in a memory and power supply to the sections other than the memory is stopped). In the CLPC, the power consumptions in the three steps of the operating modes are 20 W, 10 W and 1 W; the setting detail in the power consumption setting mode 1 is "Unlimited"; the setting detail in the power consumption setting mode 2 is "Display OFF" on the display unit, and the setting detail in the power consumption setting mode 3 is "Suspended" (a state in which a device or a program in an executed state is temporarily stopped and power supply to the CPU is stopped).

Information on the configuration of the distributed system shown in FIG. 4 is described in the user information DB 201, the organization structure DB 202 and the apparatus place DB 203, as shown below.

User Information DB:
[User Names, Organization Numbers, User Priorities (A, B . . . )

=[U1, A00, A]

=[U2, A00, B]

=[U3, A10, A]

=[U4, A10, B]

=[U5, A10, B]

Organization Structure DB:
[Superior-Organization Number, Subordinate-Organization Number]=[A00, A10]

Apparatus place DB 203:
[Apparatus Management Number, Apparatus Model, Organization Number, Installation Area, Use]

=[1, Sever X, A00, Third Floor, Server]

=[2, CLPC, A00, Third Floor, Client]

=[3, CLPC, A00, Third Floor, Client]

=[4, CLPC, A10, Second Floor, Server]

=[5, CLPC, A10, Second Floor, Client]

=[6, CLPC, A10, Second Floor, Client]

=[7, CLPC, A10, Second Floor, Client]

The operation of the management server 10 will be described first with respect to setting of resource distribution to the apparatuses to be managed.

If a target period in which management is to be performed begins from April 2003, the management server 10 starts distributing a resource, for example, in mid-March on the basis of conditions set by a resource manager. An amount of power to be distributed and a reserve amount of power were obtained with respect to a case where the resource manager sets a target cut of 30% from a monthly power consumption predicted with respect to ordinary operation, reserves 10% of the power consumption and supplies the remainder to the organization number A00 with the intention of using the same as a representative of the subordinate organization.

Monthly Power Consumption Computed Value of Ordinary Operation:

(100 W+20 W)×24 hours×30 days×5 apparatuses×9 hours×21 days

=105,300 WH

Monthly Power Consumption Target Value:

105,300 WH×0.7=73,710 WH 73,710 WH×0.9=66,339 WH (distributed), 7,371 WH (reserve)

Subsequently, the management server 10 distributes a license to use the resource (token).

Figure 5:
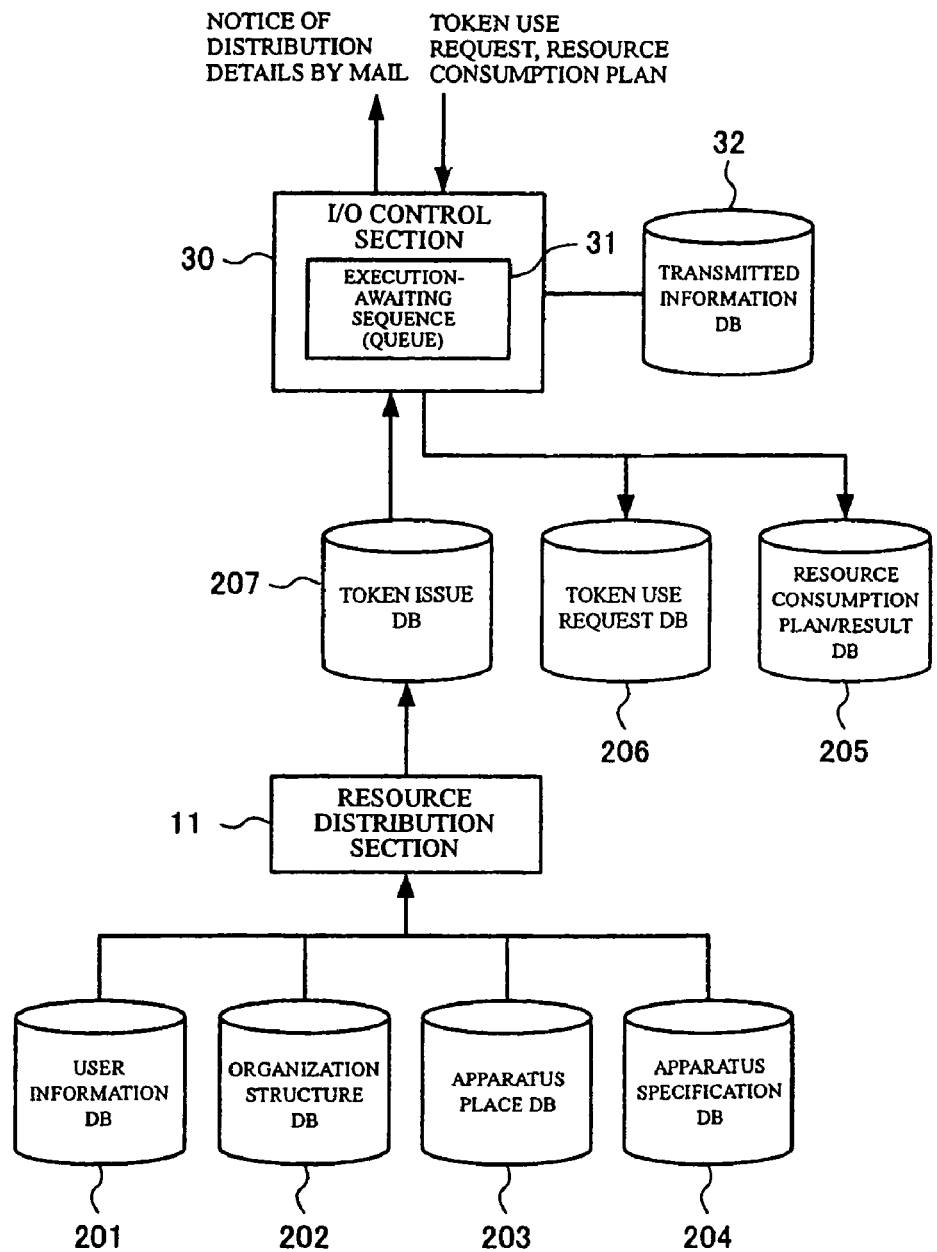
FIG. 5 is a diagram for explaining the operation with respect to issue and distribution of a token by the management server in the embodiment.

FIG. 5 is a diagram for explaining the operation with respect to issue and distribution of a token by the management server 10.

Referring to FIG. 5, the resource distribution section 11 reads out necessary information from the user information DB 201, the organization structure DB 202, the apparatus place DB 203 and the apparatus specification DB 204 and distributes tokens. Distribution of tokens is started by saving data on distribution of the resource in the token issue DB 207. An example of data saved in the token issue DB 207 will be described.

[Token Numbers, Division Numbers, Token Distribution Destinations (User Names, Organization Numbers), Kinds of Resources to be Provided, Amounts of Resources to be Provided, Provision Periods (Beginning, End), Remaining Amounts of Resources to be Provided]

=[1, 0, (U1, A00), Electric Power, 66,339 WH, (Apr. 1, 2003, Apr. 30, 2003), 66,339 WH]

When the data is saved in the token issue DB 207, the I/O control section 30 reads out this data and notifies the token distribution destinations (user names) shown in the data items of details of the data (token distribution details). In this description, it is assumed that the user U1 is notified on the basis of the above-described contents of the token issue DB 207.

The user U1 receiving the notice redistributes the distributed token to the organization, apparatus and user under the user's control. In this description, it is assumed that 21,000 WH for the subordinate organization A10 is distributed to the user U3 who is the administrator. The results of redistribution by the user U1 are sent from the apparatus to be managed, used by the user U1, (e.g., CLPC having the apparatus management number 2) to the management server 10 and are reflected in data stored in the token issue DB 207 by the I/O control section 30. The contents of the I/O control section 30 after redistribution are shown below.

Token Issue DB:
[Token Numbers, Division Numbers, Token Distribution Destinations (User Names, Organization Numbers), Kinds of Resources to be Provided, Amounts of Resources to be Provided, Provision Periods (Beginning, End), Remaining Amounts of Resources to be Provided]

=[1, 0, (U1, A00), Electric Power, 45,339 WH, (Apr. 1, 2003, Apr. 30, 2003), 45,339 WH]

=[1, 1, (U3, A10), Electric Power, 21,000 WH, (Apr. 1, 2003, Apr. 30, 2003), 21,000 WH]

Subsequently, the management server 10 accepts token use requests from the users (organizations) of the apparatuses to be managed. A token request is made by adding data connecting a user who is a token use requester, a token number and a division number is added to the token use request DB 206. In this description, it is assumed that the user U1 who is the organization number A00 administrator makes a token use request for use of the apparatuses (apparatus management numbers 1, 2, and 3) under the user's control in a sharing manner. Also, the user U3 who is the organization number A10 administrator distributes the resource to the users by dividing the token and the users U3, U4, and U5 make token use requests. The contents of the token issue DB 207 and the token use request DB 206 after token division and making of token use requests are shown below.

Token Issue DB:

[Token Numbers, Division Numbers, Token Distribution Destinations (User Names, Organization Numbers), Kinds of Resources to be Provided, Amounts of Resources to be Provided, Provision Periods (Beginning, End), Remaining Amounts of Resources to be Provided]

=[1, 0, (U1, A00), Electric Power, 45,339 WH, (Apr. 1, 2003, Apr. 30, 2003), 45,339 WH]

=[1, 1, (U3, A10), Electric Power, 12,000 WH, (Apr. 1, 2003, Apr. 30, 2003), 12,000 WH]

=[1, 2, (U3, A10), Electric Power, 4,000 WH, (Apr. 1, 2003, Apr. 30, 2003), 4,000 WH]

=[1, 3, (U4, A10), Electric Power, 2,500 WH, (Apr. 1, 2003, Apr. 30, 2003), 2,500 WH]

=[1, 4, (U4, A10), Electric Power, 2,500 WH, (Apr. 1, 2003, Apr. 30, 2003), 2,500 WH]

Token Use Request DB:

[Token Numbers, Division Numbers, Token Use Requesters (User Names, Organization Numbers)]

=[1, 0, (NULL, A00)], denoting that the resource to consumed is assigned to tokens 1, 0 when it is not used by the user of the apparatus managed at the organization number A00. Generated at the time or token distribution.

=[1, 0, (U1, NULL)], denoting that the user U1 uses tokens 1, 0.

=[1, 0, (U2, NULL)], denoting that the user U2 uses tokens 1, 0.

=[1, 1, (NULL, A10)], denoting that the resource to consumed is assigned to tokens 1, 1 when it is not used by the user of the apparatus managed at the organization number A10. Generated at the time or token distribution.

=[1, 2, (U3, NULL)], denoting that the user U3 uses tokens 1, 2.

=[1, 3, (U4, NULL)], denoting that the user U4 uses tokens 1, 3.

=[1, 4, (U5, NULL)], denoting that the user U5 uses tokens 1, 4.

In the token use requester item in the data stored in the token use request DB 206 as shown above, only one of the user name and the organization number is input and NULL (empty) is entered for the other.

It is not necessarily required that the token use request DB 206 and the token issue DB 207 be provided as separate data bases. However, such an arrangement ensures that delivery and reception of a token can be performed over an organization to which the token is distributed. In this case, the distributed resource and the use requester are connected only after referring to the token use request DB 206 and the token issue DB 207 in combination. However, in a case where electric power is provided as a resource and the operations of electronic apparatuses are controlled as in this embodiment, there is a possibility of the resource being consumed even when no token use request is made. A basic entry may be made at the time of token distribution to cope with such a situation.

A user who is a token use requester refers to the token issue DB 207 by using information on the token use requester (user name, organization number), a token number and a division number as a key when making a token use request to know the kind of a resource to be provided, the provision period (beginning, end) and the remaining amount of the resource to be provided. The token use requester makes a resource consumption plan to determine at which pace the resource will be used in the provision period. This resource consumption plan is set together with the token use request to the management server 10 to be saved as a resource consumption plan value (amount) in the resource consumption plan/result DB 205.

To facilitate plan making, a method described below may be adopted. First, for "uniform type", the total resource amount is divided by the number of days that will pass or the number of workdays to obtain the amount of consumption per day, and the obtained value is integrated to obtain a plan value at a particular date or in a particular period, this value is set as a fixed value. Then, a typical consumption curve, e.g., an "early-stage-relaxed type" such that the resource consumption in an early stage is slightly increased or an "early-stage-saving type" such that the resource consumption in an early stage is reduced is selected as desired according to the kind of the apparatus, a request from the organization, etc., and the plan according to the fixed value is made changeable on the basis of such a consumption curve. Also, a consumption curve may be individually edited to enable making of a unique resource consumption plan.

For example, a resource consumption plan is not fixedly set with respect to each of tokens. Instead, a resource consumption plan may be applied with respect to a token use request to obtain a resource consumption plan value (amount) at a particular date with respect to a predetermined kind of resource, thereby making an entry (e.g., "April 1, 0:00, 0:05, 0:10"). When the same token use requester obtains the same resource by another token, the resource consumption plan value is incremented. If data is formed in this manner, a record can be instantly obtained at a particular date.

The operation with respect to resource management and provision control will next be described.

Figure 6:
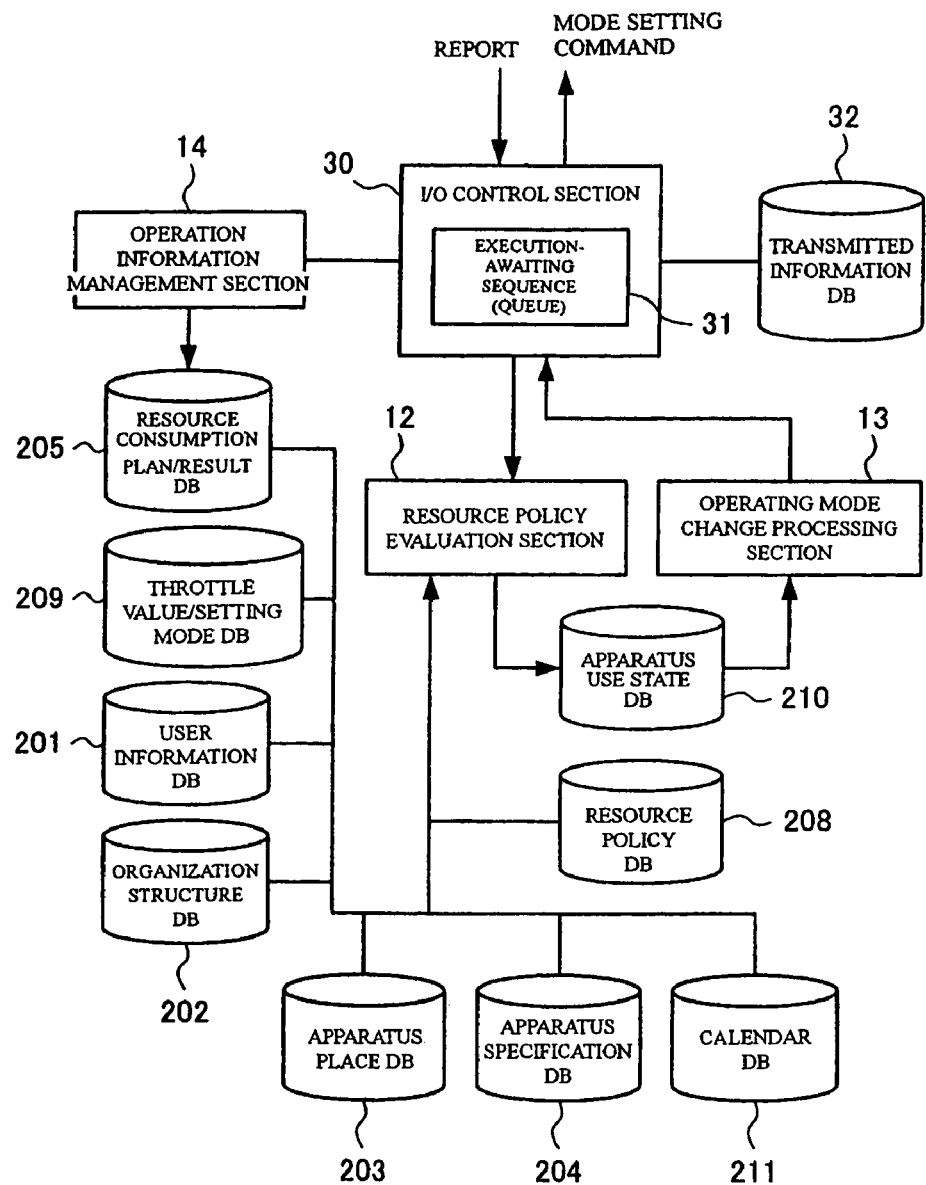
FIG. 6 is a diagram for explaining the operation of the management server in the embodiment with respect to resource management and operation control on the apparatuses to be managed.

FIG. 6 is a diagram for explaining the operation of the management server 10 with respect to the resource management and operation control on the apparatuses to be managed.

It is assumed that the server X (apparatus management number 1) under the control of the organization A00 is started at 9:00 on April 1 from which a management period begins. At this time, the server X sends predetermined data to the management server 10 to report the current operating condition.

FIG. 7 is a diagram showing an example of a configuration of data sent from the server X, which is an apparatus to be managed, to the management server 10 in this report.

In FIG. 7, "Task Status: 60%" indicates that the task status of the server X is 60% of the full operation. "Received Power Consumption Setting Mode: none" indicates that the setting of the power consumption setting mode sent from the management server 10 is not yet received. "Power Consumption Setting Mode: 1" indicates that the power consumption setting mode of the server X at the present point in time is an unlimited (full operation) state.

When the I/O control section 30 of the management server 10 receives the report from the server X, it extracts the data from the report and saves it in the apparatus use state DB 210, as shown below.

Apparatus Use State DB:

[Date, User Name, Task Status, Apparatus Management Number, Received Power Consumption Setting Mode, Current Power Consumption Setting Mode, Evaluated Power Consumption Setting Mode, Other Received Information]

=[Apr. 1, 2003 9:00, none, 60%, 1, 1, none, none,
Sever X, Monitor XXYY]

Since the data is received by the management server 10 from the server X, the current power consumption setting mode (1) of the server X is in the value of the received power consumption setting mode. Also, no information is entered in the user name item, the current power consumption setting mode item and the evaluated power consumption setting mode item (none).

The above operation is also performed in the same manner between the management server 10 and the other apparatus to be managed (apparatus management numbers 2 to 7), constituting the distributed system. That is, a report is sent from each apparatus to be managed to the management server 10 and data on the apparatus to be managed is written to the apparatus use state DB 210 in the management server 10.

In an initial stage immediate after the startup of the apparatus to be managed, the throttle value is an initial value=100 (maximum value) and a throttle adjustment value=0, that is, the throttle is in an unlimited (full operation) state. When the apparatus use state DB 210 is updated or periodically at monitoring time intervals set in advance, the resource policy evaluation section 12 of the management server 10 evaluates the resource policy. The resource policy evaluation section 12 identifies the apparatus to be evaluated, on the basis of an evaluation condition given advance. If there is a limit on the throttle value, it obtains the maximum throttle value satisfying the evaluation condition within the limit range. At this time, if there is a forcible setting condition such as fixation of the throttle value of designation of the setting mode, such a condition is used with priority.

If the throttle value and the throttle adjustment value are changed as a result of evaluation, the resource policy evaluation section 12 obtains the power consumption setting mode to be set in the object apparatus, by using the changed throttle value and throttle adjusted value and by referring to the throttle value/setting mode DB 209. The resource policy evaluation section 12 writes the value of the power consumption setting mode to the evaluated power consumption setting mode in the apparatus use state DB 210.

In a case where a plurality of evaluation conditions are given in resource policy evaluation, various processing methods satisfying such evaluation conditions may be conceivable. In this description, however, it is assumed that the obtained power consumption setting mode value and the evaluated power consumption setting mode value written in advance are compared with reach other and one of these values more effective in energy saving (the larger value in this case) is written to the apparatus use state DB 210.

After the evaluation by the resource policy evaluation section 12 on the basis of all the evaluation conditions, the operating mode change processing section 13 of the management server 10 compares the three values (the received power consumption setting mode, the evaluated power consumption setting mode and the current power consumption setting mode) to the power consumption setting mode by referring to the apparatus use state DB 210. If the evaluated power consumption setting mode and the current power consumption setting mode or the received power consumption setting mode differ from each other with respect to some of the apparatuses, the operating mode change processing section 13 issues to the apparatus a mode setting command to change the power consumption setting mode, and substitutes the value of the evaluated power consumption setting mode for the current power consumption setting mode. The issued mode setting command is transmitted to the object apparatus by the I/O control section 30.

When the apparatus to be managed receives the mode setting command transmitted from the management server 10, it actually changes the power consumption setting mode according to the command, and notifies the management server of the value of the changed power consumption setting mode value.

In the management server 10, the I/O control section 30 saves in the received power consumption setting mode in the apparatus use state DB 210 the power consumption setting mode value received from the apparatus to be managed. Further, the I/O control section 30 periodically compares the values of the current power consumption mode and the received power consumption setting mode in the apparatus use state DB 210 and again issues a mode setting command to change the power consumption setting mode to the object apparatus having different values of these power consumption setting modes.

Separately from the above-described sequence of operations by the resource policy evaluation section 12 and the operating mode change processing section 13, processing for updating the resource consumption plan/result DB 205 is performed by the operation information management section 14.

The operation information management section 14 updates the resource consumption result value (amount) in the resource consumption plan/result DB 205 when receiving operation information from the apparatuses to be managed or each time a predetermined time period elapses. Updating of the resource consumption result value (amount) is performed as described below. For example, when a predetermined user uses a predetermined apparatus in a predetermined mode for five minutes, the operation information management section 14 obtains the resource consumption amount by referring to the apparatus specification DB 204. The operation information management section 14 adds the resource consumption amount obtained by factoring in the lapse of time to the resource consumption result value obtained before and stored in the resource consumption plan/result DB 205, and writes the addition result to the resource consumption result value at the present point in time.

The value obtained by dividing the resource consumption result value by the plan value may be defined as a resource consumption amount versus plan value % excess. From this value, an evaluated value of the result value with respect to the resource consumption plan value can be given. If the operating conditions of the apparatuses to be managed are controlled on the basis of this evaluated value, control can be performed in such a manner that when a resource is excessively used by a predetermined one of the apparatuses in a predetermined time period, the operating condition is changed in the direction for reduction in the amount of use, and that the amount of resource is sufficiently large, the operating condition is controlled in the direction for allowing free use of the resource by apparatus.

The power consumption setting mode of the apparatuses to be managed is dynamically controlled as described above and the results of setting of the mode are managed in the management server 10.

The operation information management section 14 obtains operation information from one of the apparatus to be managed when the apparatus is started up, as described above.

Also, the operation information management section 14 may issue an inquiry command to each apparatus to be managed according to predetermined timing (e.g., periodically) for inquiry about the current operating condition to collect operation information.

Each apparatus to be managed examines the operating condition at the present point in time according to the inquiry command from the management server 10, and returns operation information including the requested information item as a report. When a change is made in the operating condition of one of the apparatuses to be managed at a time other than the time at which the apparatus starts up, the apparatus may actively send an operation information report to the management server 10.

Resource policy evaluation and control of the power consumption setting mode will be described in more detail with respect to a concrete example thereof.

It is assumed that data shown below is stored in the throttle value/setting mode DB 209.

Throttle Value/Setting Mode DB:

[Throttle Value, User Priorities, Task Statuses, Kinds of Resources, Uses, Power Consumption Setting Mode]

=[0-100, A, any, Electric Power, Client, 1]

=[20-100, any, not(Idle), Electric Power, Client, 1]

=[90-100, any, Idle, Electric Power, Client, 1]

=[70-89, any, Idle, Electric Power, Client, 2]

=[20-69, any, Idle, Electric Power, Client, 3]

=[0-19, any, any, Electric Power, any, 3]

In the data items stored in the throttle value/setting mode DB 209, "any" denotes that the value in the corresponding item is not limited (for example, the setting in the final line in the above-described example of setting denotes that this set value can be used no matter what the values of the user priority item, the task state item and the apparatus use item. Also, "not (Idle)" with respect to the task status denotes that the state where the task status of the apparatus to be managed is not "Idle" is to be treated.

It is also assumed that a resource policy is set as a resource management target with respect to the unit corresponding to the distributed system, as shown below.

Resource Policy DB

Evaluation Object Limitation Conditions, Operation Object Conditions: (Target Period, Time Period, Kind of Resource, Organization Number, User Priority, Resource Consumption Amount Versus Plan Value % Range, Task Status, Installation Area, Use, Setting Mode)

Condition 1 Noon Recess on Second Floor

Evaluation Object Limitation Conditions: (Business Day, 11:30 to 12:30, Electric Power, any, any, any, any, Second Floor, Client, any)

Operation Object Limitation Conditions: (Business Day, 11:30 to 12:30, Electric Power, any, any, any, Idle, Second Floor, Client, any)

Evaluation Condition: Total Power Consumption Value is 50 W or less

Operation Detail: Throttle Value Reevaluation

Condition 2 Noon Recess on Third Floor

Evaluation Object Limitation Conditions: (Business Day, 12:00 to 13:00, Electric Power, any, any, any, Idle, Third Floor, Client, any)

Operation Object Limitation Conditions: (Business Day, 12:00 to 13:00, Electric Power, any, any, any, Idle, Third Floor, Client, any) Same as Evaluation Object Limitation Conditions Evaluation Condition: Total Power Consumption Value is 60 W or less Operation Detail: Throttle Value Reevaluation Condition 3 Non-Business Day Evaluation Object Limitation Conditions: (Non-Business Day, 00:00 to 24:00, Electric Power, any, any, any, Idle, any, any, any)

Operation Object Limitation Conditions: (Business Day, 00:00 to 24:00, Electric Power, any, any, any, Idle, any, any, any) Same as Evaluation Object Limitation Conditions Evaluation Condition: None Operation Detail: Throttle Value=20

Condition 4 Resource Consumption Amount Versus Plan Value % Excess

Evaluation Object Limitation Conditions: (any, any, Electric Power, any, any, >105%, any, any, any, any)

Operation Object Limitation Conditions: (any, any, Electric Power, any, any, >105%, Idle, any, any, any)

Evaluation Condition: None

Operation Detail: Throttle Value=(100%−Resource Consumption Amount Versus Plan Value %)×100

Condition 5 Resource Consumption Plan Smooth Progress

Evaluation Object Limitation Conditions: (any, any, Electric Power, any, any, <95%, any, any, any, any)

Operation Object Limitation Conditions: (any, any, Electric Power, any, any, <95%, Idle, any, any, any)

Evaluation Condition: None

Operation Detail: Throttle Value=0

It is assumed that even after resource policy evaluation has been performed after startup of the apparatuses to be managed, no change is made in the throttle value and the throttle adjustment value.

When the time reaches 11:30 after use of each apparatus has been started, the condition 1 "Noon Recess on Second Floor" is satisfied and resource policy evaluation is therefore performed. In this description, it is assumed that reevaluation of the throttle value is performed as evaluation under the condition 1 so that the total power consumption of the client (CLPC) installed on the second floor is 50 W or less, and that the CLPC having the apparatus management number 7 in the operation object apparatuses, i.e., the apparatuses to be managed having the apparatus management numbers 5, 6, and 7, is used by the user U5 and only the CLPCs having the apparatus management numbers 5 and 6 are in the Idle state and perform no task. However, the user priority of the user 5 is not A.

FIG. 8 is a diagram showing values in a case where the resource policy is reevaluated by the resource policy evaluation section 12.

In the example shown in FIG. 8, the sum of power consumptions by the CLPCs having the apparatus management numbers 5, 6, and 7 is obtained as described below (in FIG. 8, however, the apparatus management number is shown in such a simplified state that the CLPC having the apparatus management number 5 is shown as CLPC 5). First, the throttle value/setting mode DB 209 is referred to with respect to the CLPCs having the apparatus management numbers 5 and 6. Since the use is "Client"; the task status is "Idle"; and the user priority is not A, the power consumption setting mode 1 (shown simply as "Mode 1" in FIG. 8) when the throttle value is 90 to 100; the power consumption setting mode 2 when the throttle value is 70 to 89; and the power consumption setting mode 3 when the throttle value range is 0 to 69 are obtained as set values. If at this time a plurality of data entries satisfying the requirements exist in the throttle value/setting mode DB 209, one of them having the largest number of coincidences with the limitative conditions other than wild cards such as "any" is used.

The throttle value/setting mode DB 209 is also referred to with respect to the apparatus management number 7. Since the use is "Client"; the task status is "not(Idle)"; and the user priority is not A, the power consumption setting mode 1 when the throttle value is 20 to 100 and the power consumption setting mode 3 when the throttle value is 0 to 19 are obtained as set values.

The power consumption of the apparatus model CLPC is 20 W, 10 W and 1 W in the power consumption setting modes 1, 2, and 3, respectively, as shown in FIG. 4. Therefore the values shown in FIG. 8 are obtained. That is, the total power consumption value is 60 W when the throttle value is 90 to 100, 40 W when the throttle value is 70 to 89, 20 W when the throttle value is 20 to 69, and 3 W when the throttle value is 0 to 19. Since the evaluation condition is that the total power consumption value is 50 W or less, the maximum throttle value satisfying this condition is 89, and 89 is set as the throttle value.

In the case where evaluation of the throttle value is performed by the resource policy evaluation section 12 and Throttle Value=89 is set on the basis of the setting conditions shown in FIG. 8, processing described below is performed. Since the throttle value is changed from the initial value 100 to 89, the resource policy evaluation section 12 refers to the throttle value/setting mode DB 209 to obtain the power consumption setting mode to be set in the apparatuses to be operated. The resource policy evaluation section 12 writes the obtained power consumption setting mode value to the evaluated power consumption setting mode in the apparatus use state DB 210. The record written to the apparatus use state DB 210 is shown below. Since the CLPC having the apparatus management number 7 is not in the Idle state but used by the user U5 (at a rate of operation of 70%), it is not included in the operation object limitation conditions. Therefore writing of the power consumption setting mode is not performed and no change is made in the value.

Apparatus Use State DB:

[Date, User Name, Task Status, Apparatus Management Number, Received Power Consumption Setting Mode, Current Power Consumption Setting Mode, Evaluated Power Consumption Setting Mode, Other Received Information]

=[Apr. 1, 2003 11:30, none, Idle, 5, 1, 1, 2, ...]

=[Apr. 1, 2003 11:30, none, Idle, 6, 1, 1, 2, ...]

=[Apr. 1, 2003 11:30, U5, 70%, 7, 1, 1, 2, ...]

After evaluation under the condition 1, conditions satisfying the evaluation object limitation conditions in the other conditions are briefly evaluated. At the time 11:30, however, no other evaluation event occurs. After the above-described evaluation, therefore, the operating mode change processing section 13 refers to the apparatus use state DB 210 to find the CLPCs having the apparatus management numbers 5 and 6 as a terminal having different values of the current power consumption setting modes and the received power consumption setting mode or the evaluated power consumption setting mode. The operating mode change processing section 13 then issues to these apparatuses a mode setting command to change the power consumption setting modes. The operating mode change processing section 13 also substitutes the value of the evaluated power consumption setting mode in the apparatus use date DB 210 for the current power consumption setting mode. That is, Apparatus Use State DB:

[Date, User Name, Task Status, Apparatus Management Number, Received Power Consumption Setting Mode, Current Power Consumption Setting Mode, Evaluated Power Consumption Setting Mode, Other Received Information]

=[Apr. 1, 2003 11:30, none, Idle, 5, 1, 2, 2, ...]

=[Apr. 1, 2003 11:30, none, Idle, 6, 1, 2, 2, ...]

Each object apparatus receives a mode setting command transmitted from the management server 10 and actually changes the power consumption setting mode from 1 to 2. Since "Display OFF" is set in the above-described apparatus specification DB 204 in the case of the power consumption setting mode 2 of the CLPC, display on the CLPCs having the terminal management numbers 5 and 6 is turned off. After the completion of this change in setting, each object apparatus notifies the management server of the changed power consumption setting mode value.

The I/O control section 30 of the management server 10 receives the notice from the apparatus to be managed and saves the received power consumption setting mode value in the received power consumption setting mode in the apparatus use state DB 210. That is, Apparatus Use State DB:

[Date, User Name, Task Status, Apparatus Management Number, Received Power Consumption Setting Mode, Current Power Consumption Setting Mode, Evaluated Power Consumption Setting Mode, Other Received Information]

=[Apr. 1, 2003 11:30, none, Idle, 5, 2, 2, 2, ...]

=[Apr. 1, 2003 11:30, none, Idle, 6, 2, 2, 2, ...]

The received power consumption setting mode, the current power consumption setting mode and the evaluated power consumption setting mode are thereby made equal to each other. In this state, the evaluated power consumption setting mode is set in the apparatuses to be managed and there is no need to further issue a mode setting command.

Subsequently, management of the resource consumption amount and operation control on the apparatuses to be managed, which will not be described by repeating the description of the operation, are executed in the same manner with respect to the other conditions items (conditions 2 to 5).

In addition to the above-described operation control on the apparatuses to be managed on the basis of time, non-business days, resource consumption amount versus plan value % excess, etc., scheduled operations based on staring and powering off the apparatuses to be managed according to a predetermined schedule can be performed. For example, the management server 10 is arranged to have the function of transmitting a remote wake-up command to enable such scheduled operations. Also, management may be performed in such a manner that in a case where the necessary amounts of use of resources are high and the remaining amounts of tokens become insufficient, the resource manager is requested to newly distribute tokens. Further, management may be performed in such a manner that money charging for tokens and repayment are performed according to certain conditions, e.g., different modes of distribution of tokens such as a mode of distribution in an initial stage and a mode of distribution for addition, the amounts of tokens distributed in such modes, and the kinds and amounts of unused tokens.

The embodiment has been described with respect to the arrangement in which the execution-awaiting sequence 31 and the transmitted information DB 32 are provided in the I/O control section 30 of the management server 10. However, the same arrangement may be used for transmitting and receiving means in each apparatus to be managed. An execution-awaiting sequence and a transmitted information DB may be provided in each apparatus to be managed to ensure that operation information is accumulated even in a case where the connection between the apparatus to be managed and the management server 10 is cut off due to a network fault or the like. After restoration of the connection, a report including the accumulated operation information can be transmitted from the apparatus to be managed to the management server 10.

Also, a function may be provided as a means for solving a fault problem, as described below. As a means for avoiding failure to establish communication between each apparatus to be managed and the management server after startup of the apparatus or at a time when a return from the energy saving mode should be made, a setting mode value for setting in the event of a fault the full-operation power consumption setting mode 1 after a lapse of a predetermined time period may be set as an initial value at the time of introduction of management software into each apparatus to be managed. Alternatively, a setting mode value for conversely setting in the event of a fault the sleeping mode, i.e., the power consumption setting mode 3, for a reason in terms of security may be set as an initial value at the time of introduction of management software.

In the above-described arrangement, each apparatus to be managed actually changes the power consumption setting mode when receiving a mode setting command. However, the mode setting command may also have a control option of making a mode change to the corresponding power consumption set value or making the apparatus operate so as to avoid an excess over the corresponding power consumption set value.

Resource management and apparatus operation control according to this embodiment have been described with respect to an example of selection of the operating mode (power consumption setting mode) of the electronic apparatus. Needless to say, this embodiment is not limited to the above-described concrete system configuration and operation. For example, apart from the management of the amount of use of electric power, management of the amount of use of printing sheets in printers may be performed to control the operations of the printer and printout execution priorities. If control is performed in such a manner that the priority with which printout according to a request from a particular user or apparatus to be managed is performed is reduced or the delay time from a printing request to a start of printing is increased, unnecessary operations for printout of a document which can be checked on the screen of a display unit without being output as a print can be reduced. Such control contributes to a reduction in the resource consumption amount.

If this embodiment is used for resource management other than management of the electric power consumption as described above, the resource distribution section 11 and the resource policy evaluation section 12 in the configuration of the management server 10 shown in FIG. 4 for example perform distribution according to the kind of a resource such as printing sheets to be managed, and monitor the state of use of the resource. The operating mode change processing section 13 controls the operating conditions of apparatuses to be managed, such as priorities with respect to processing using the resource and setting of a delay time, according to the kind of the resource. As the data storage section 20, a data base for suitably managing information according to the kind of the resource is prepared.

The apparatuses to be managed by the management server 10 are not limited to electronic apparatuses such as computers. For example, certain lighting controllers in a building are managed and controlled as apparatuses to be managed so as to reduce the electric power consumption.

Figure 9:
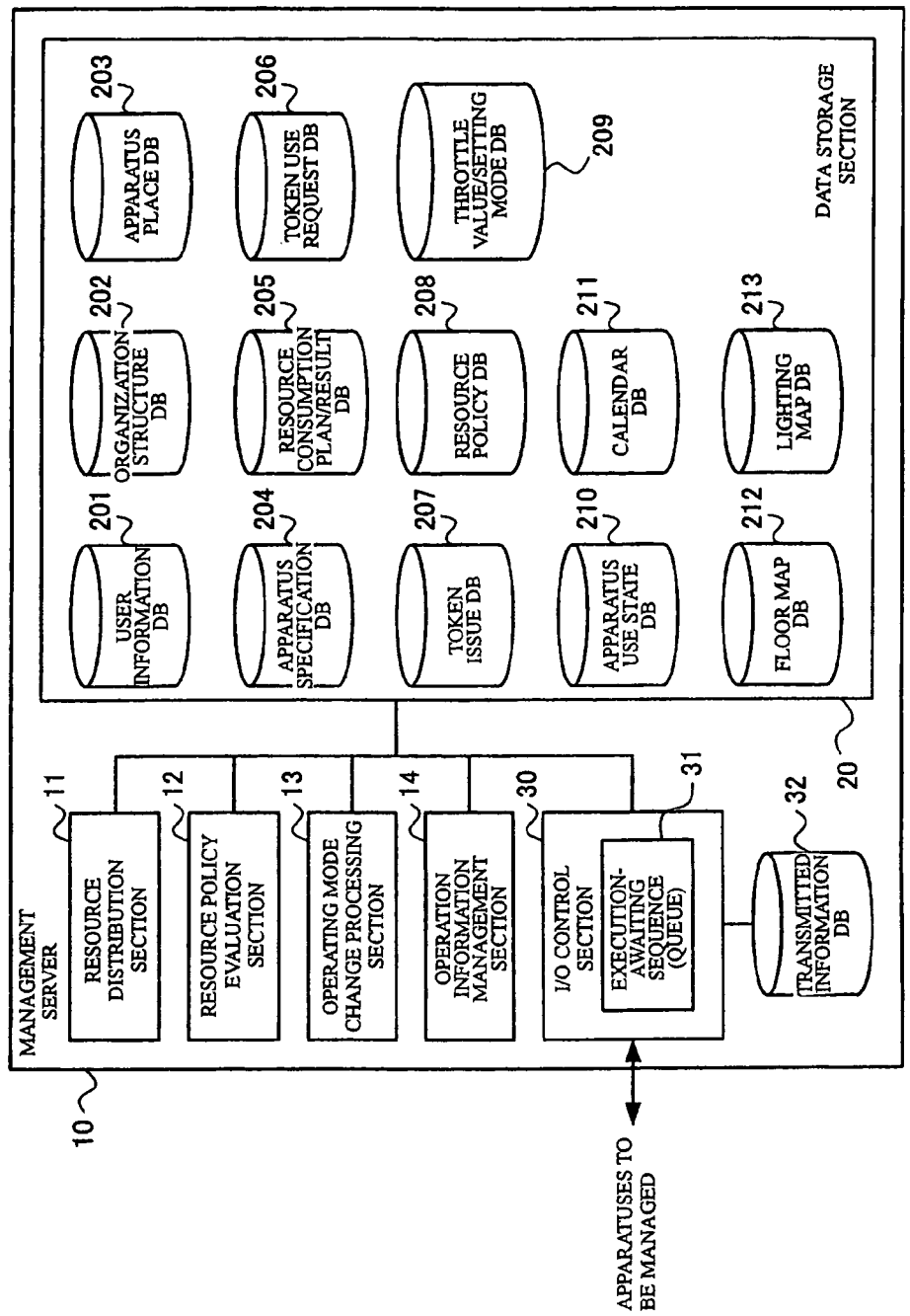
FIG. 9 is a diagram showing an example of a configuration of a management server in a case where the embodiment is used for management and control of the consumption of electric power consumed by lighting controllers.

FIG. 9 is a diagram showing an example of a configuration of a management server 10 in a case where this embodiment is used for management and control of the consumption of electric power consumed by lighting controllers.

The management server 10 shown in FIG. 9 differs from the management server 10 shown in FIG. 4 in that a floor map DB 212 and a lighting map DB 213 are added to the data storage section 20.

In the floor map DB 212, information on the positions of provided terminal devices (CLPCs or the like) is represented, for example, by coordinate values on a floor map relating to each of floors of a building, and is stored.

In the lighting map DB 213, information on the positions of provided lighting elements and the state of lighting (put-on state or put-out state) of the lighting elements is represented, for example, by coordinate values on a lighting map relating to each of the floors of the building, and is stored.

The contents of the floor map DB 212 and the lighting map DB 213 reflect results of evaluation by the resource policy evaluation section 12. The operating mode change processing section 13 issues a mode setting command for operation control by referring not only to the apparatus use state DB 210 but also to the lighting states of the lighting elements stored in the lighting map DB 213.

Figure 10:
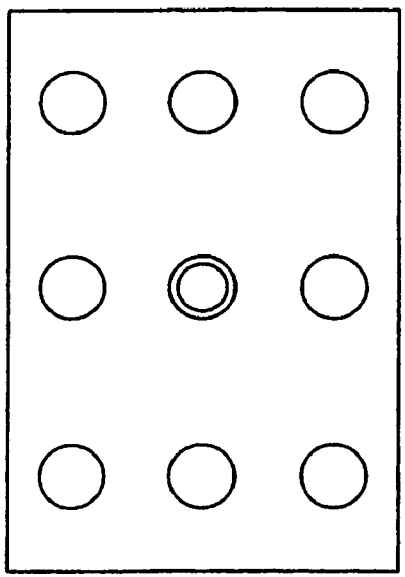
FIG. 10 is a diagram showing the positions of lighting elements in a predetermined room and an example of a lighting device power saving pattern.
Figure 10:
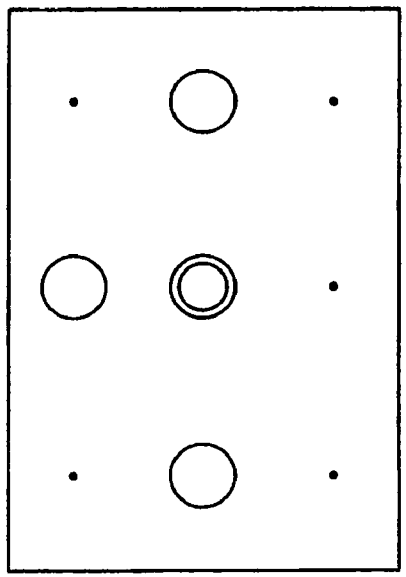
Figure 10:
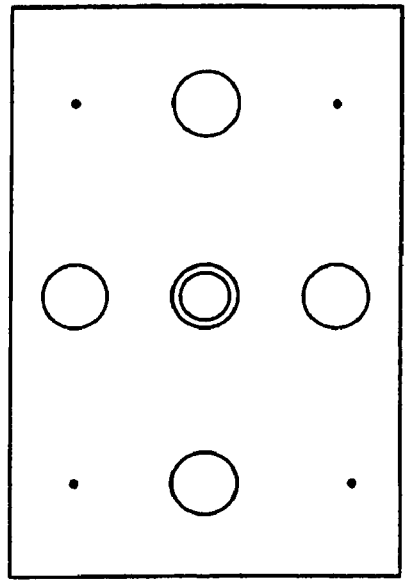
Figure 10:
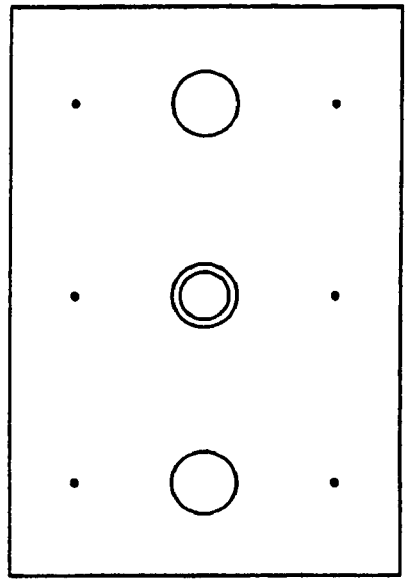

FIG. 10 is a diagram showing the positions of the lighting elements in a predetermined room and an example of a lighting device power saving pattern.

The power saving pattern shown in FIG. 10 is defined about the lighting element (indicated by a double circle in the figure) closest to a terminal device provided in a place to be illuminated, and with respect to nine lighting elements (indicated by circles in the figure) positioned right above the place. Information on this pattern is stored in the throttle value/setting mode DB 209 or a predetermined data base corresponding to this.

Mode 1: Lighting elements in nine places right above the place to be illuminated (terminal device) are put on.

Mode 2: Lighting elements in five places right above the place to be illuminated (terminal device) are put on.

Mode 3: Lighting elements in four places right above the place to be illuminated (terminal device) are put on.

Mode 4: Lighting elements in three places right above the place to be illuminated (terminal device) are put on.

Mode 5: Lighting element in one place right above the place to be illuminated (terminal device) is put on.

Mode 6: Lighting elements in nine places right above the place to be illuminated (terminal device) are put off.

When the resource policy evaluation section 12 evaluates a resource policy on the basis of predetermined evaluation conditions, it performs evaluation by treating the lighting elements on the floor in the same manner as when treating the above-described terminals. A mode of setting the lighting element positioned closest to a predetermined one of the terminal devices (e.g., a terminal device used by a predetermined user) is obtained according to the evaluation conditions. Thereafter, the resource policy evaluation section 12 projects the coordinates stored in the floor map DB 212 to the coordinates stored in the lighting map DB 213 to obtain the put-on/put-off state of each of the lighting elements according to the lighting element setting mode.

Evaluation is performed in the same manner with respect to a predetermined one of the floors, all the provided terminal devices and the lighting elements about the terminal. Information on the put-on/put-off state of all the lighting elements on the floor is managed, for example, through flag data, for example, on the illumination map corresponding to the floor. When a change in the flag data (a case where the flag data corresponding to some of the lighting elements in the put-on state is changed to indicate the put-off state, or a case where the flag data corresponding to some of the lighting elements in the put-off state is changed to indicate the put-on state) is detected from reports from the apparatuses to be managed or by evaluation periodically performed by the resource policy evaluation section 12, operations described below are performed. That is, the operating mode change processing section 13 refers to the lighting map DB 213 and issues to a lighting control section a mode setting command for adjusting the state of lighting of the lighting elements corresponding to the changed flag data to the details of the flag data. The lighting control section for control on the floor changes the lighting states of the lighting elements according to the mode setting command.

Thus, the power consumption for lighting is dynamically controlled on the basis of the state of use of the terminal device on the predetermined floor and the evaluation conditions set with respect to the lighting elements on the floor.

While this embodiment has been described with respect to an arrangement in which a management server is provided for a predetermined distributed system and in which the resource consumption in the entire system and operation control on apparatuses constituting the system are performed in a centralized manner, the management system of the present invention can be implemented in a peer-to-peer configuration such that each of apparatuses constituting a distributed system has management server functions and exchanges information with the other apparatuses when required.

According to this embodiment, a management mode can be used in which basic data in the apparatus specification DB 204, the throttle value/setting mode DB 209 and the calendar DB 211 is distributed by being stored on a predetermined readable medium or by being transmitted through a network, and a service for setting a more effective resource policy can be provided by providing a template for facilitating setting of a resource policy or by analyzing data stored in the resource consumption plan/result DB 205, the apparatus use state DB 210, etc.

The present invention arranged as described above has the advantage of realizing effective resource management and resource provision control by dynamically controlling the operating condition of each of the apparatuses to be managed, on the basis of a resource consumption target set with respect to a unit corresponding to the entire distributed system, the entire building in which the distributed system is installed or an organization using the distributed system.

What is claimed is:

1. A method for managing at least one apparatus coupled to a management server, the method performed by the management server, the method comprising:
distributing a first resource to said at least one apparatus pursuant to user data and apparatus data, wherein the user data describes at least one entity using the first resource, and wherein the apparatus data specifies said at least one apparatus that consumes the first resource;
monitoring a respective operating condition associated with consumption of the distributed first resource by each apparatus of said at least one apparatus pursuant to a first resource policy for the first resource; and
transmitting a respective control command to said each apparatus, wherein the respective control command adjusts the respective operating condition associated with said each apparatus, said monitoring comprising:
obtaining a first resource use report from a first apparatus of said at least one apparatus, wherein the first resource use report describes how the first apparatus currently consumes the first resource, the first resource use report comprising a first date, a first entity, a first task status, a first apparatus management number, and a first received resource consumption mode, wherein the first date indicates when the first resource use report was sent from the first apparatus, wherein the first entity, comprising the first user and the first organization, indicates which entity uses the first apparatus, wherein the first task status indicates how the first apparatus uses the first resource, wherein the first task status is selected from the group consisting of "stop," "idle," and a utilization number, wherein "stop" indicates the first apparatus is not operating, wherein "idle" indicates the first apparatus is operating but does not consume the first resource, wherein the utilization number indicates a percentile ratio of the amount of the first resource that is currently consumed to the amount of the first resource that is allocated to the first apparatus, wherein the first apparatus management number identifies the first apparatus, and wherein the first received resource consumption mode indicates a mode by which the first apparatus is regulated with respect to the amount of the first resource that the first apparatus is permitted to consume;
computing a first evaluated resource consumption mode from the obtained first resource use report pursuant to a first throttle value for the first resource and a first evaluation condition for the first resource associated with a first priority of the user, wherein the first evaluation condition specifies the amount of the first resource that can be consumed by all apparatuses, wherein the first throttle value specifies a range of amounts of the first resource consumption for the first received resource consumption mode; and
determining that the evaluated first resource consumption mode does not satisfy the first evaluation condition.

2. A computer program product comprising a computer recordable medium, wherein the computer recordable medium comprises a program configured to implement a method, upon being executed by a processor, for managing at least one apparatus coupled to a management server, the method performed by the management server, the method comprising:
distributing a first resource to said at least one apparatus pursuant to user data and apparatus data, wherein the user data describes at least one entity using the first resource, and wherein the apparatus data specifies said at least one apparatus that consumes the first resource;
monitoring a respective operating condition associated with consumption of the distributed first resource by each apparatus of said at least one apparatus pursuant to a first resource policy for the first resource; and
transmitting a respective control command to said each apparatus, wherein the respective control command adjusts the respective operating condition associated with said each apparatus, said monitoring comprising:

obtaining a first resource use report from a first apparatus of said at least one apparatus, wherein the first resource use report describes how the first apparatus currently consumes the first resource, the first resource use report comprising a first date, a first entity, a first task status, a first apparatus management number, and a first received resource consumption mode, wherein the first date indicates when the first resource use report was sent from the first apparatus, wherein the first entity, comprising the first user and the first organization, indicates which entity uses the first apparatus, wherein the first task status indicates how the first apparatus uses the first resource, wherein the first task status is selected from the group consisting of "stop," "idle," and a utilization number, wherein "stop" indicates the first apparatus is not operating, wherein "idle" indicates the first apparatus is operating but does not consume the first resource, wherein the utilization number indicates a percentile ratio of the amount of the first resource that is currently consumed to the amount of the first resource that is allocated to the first apparatus, wherein the first apparatus management number identifies the first apparatus, and wherein the first received resource consumption mode indicates a mode by which the first apparatus is regulated with respect to the amount of the first resource that the first apparatus is permitted to consume;

computing a first evaluated resource consumption mode from the obtained first resource use report pursuant to a first throttle value for the first resource and a first evaluation condition for the first resource associated with a first priority of the user, wherein the first evaluation condition specifies the amount of the first resource that can be consumed by all apparatuses, wherein the first throttle value specifies a range of amounts of the first resource consumption for the first received resource consumption mode; and determining that the evaluated first resource consumption mode does not satisfy the first evaluation condition.

3. A system comprising a processor and a computer recordable medium coupled to the processor, said computer recordable medium containing instructions that when executed by the processor implement a method for managing at least one apparatus coupled to a management server, the method performed by the management server, the method comprising:

distributing a first resource to said at least one apparatus pursuant to user data and apparatus data, wherein the user data describes at least one entity using the first resource, and wherein the apparatus data specifies said at least one apparatus that consumes the first resource;

monitoring a respective operating condition associated with consumption of the distributed first resource by each apparatus of said at least one apparatus pursuant to a first resource policy for the first resource; and transmitting a respective control command to said each apparatus, wherein the respective control command adjusts the respective operating condition associated with said each apparatus, said monitoring comprising:

obtaining a first resource use report from a first apparatus of said at least one apparatus, wherein the first resource use report describes how the first apparatus currently consumes the first resource, the first resource use report comprising a first date, a first entity, a first task status, a first apparatus management number, and a first received resource consumption mode, wherein the first date indicates when the first resource use report was sent from the first apparatus, wherein the first entity, comprising the first user and the first organization, indicates which entity uses the first apparatus, wherein the first task status indicates how the first apparatus uses the first resource, wherein the first task status is selected from the group consisting of "stop," "idle," and a utilization number, wherein "stop" indicates the first apparatus is not operating, wherein "idle" indicates the first apparatus is operating but does not consume the first resource, wherein the utilization number indicates a percentile ratio of the amount of the first resource that is currently consumed to the amount of the first resource that is allocated to the first apparatus, wherein the first apparatus management number identifies the first apparatus, and wherein the first received resource consumption mode indicates a mode by which the first apparatus is regulated with respect to the amount of the first resource that the first apparatus is permitted to consume;

computing a first evaluated resource consumption mode from the obtained first resource use report pursuant to a first throttle value for the first resource and a first evaluation condition for the first resource associated with a first priority of the user, wherein the first evaluation condition specifies the amount of the first resource that can be consumed by all apparatuses, wherein the first throttle value specifies a range of amounts of the first resource consumption for the first received resource consumption mode; and determining that the evaluated first resource consumption mode does not satisfy the first evaluation condition.

* * * * *

UNITED STATES PATENT AND TRADEMARK OFFICE
CERTIFICATE OF CORRECTION

PATENT NO. : 7,584,275 B2  Page 1 of 1
APPLICATION NO. : 10/900794
DATED : September 1, 2009
INVENTOR(S) : Masakazu Shirota It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this

Fourteenth Day of September, 2010

David J. Kappos
*Director of the United States Patent and Trademark Office*